United States Patent

Bosc

[15] 3,680,096
[45] July 25, 1972

[54] CIRCUITS ELIMINATING LARGE CLUTTER ECHOES

[72] Inventor: Henri J. Bosc, Paris, France

[73] Assignee: International Standard Electric Corporation, New York, N.Y.

[22] Filed: May 28, 1970

[21] Appl. No.: 41,524

[52] U.S. Cl. .................................. 343/7.7, 343/5 DP
[51] Int. Cl. .................................. G01s 9/42
[58] Field of Search .................... 343/5 DP, 7.7, 8, 17.1

[56] References Cited

UNITED STATES PATENTS 3,441,930  4/1969  D'Obrenan et al. ............... 343/7.7

Primary Examiner—Stephen C. Bentley
Attorney—C. Cornell Remsen, Jr., Walter J. Baum, Paul W. Hemminger, Charles L. Johnson, Jr. and Thomas E. Kristofferson

[57] ABSTRACT

A digital Doppler MTI radar system including pulse Doppler video signal digital encoding by discrete range increments over a plurality of system pulse repetition intervals, sampling, averaging and detecting signals for developing an analog video train representative of target echo history over said plural repetition intervals, and a bank of Doppler filters covering the anticipated range of target velocities. Circuits are included for "counting" the range increments (in a shift register) during which reflective media of large radial size and low velocity, such as wind-swayed forested areas and hydrometeoric phenomena, present return signal energy. Lower frequency Doppler channels are disabled during the time of reception of echoes from said media, eliminating this source of clutter without also eliminating higher velocity echo reception.

4 Claims, 4 Drawing Figures

CIRCUITS ELIMINATING LARGE CLUTTER ECHOES

The present invention concerns circuits which, associated with a coherent pulse Doppler radar, make it possible to detect and eliminate large clutter echoes.

Clutter echoes, as understood in a radar system, are areas of the explored space in which high density echoes are present. These signals are undesirable echoes returned, for example, by targets of large dimensions. The fixed targets, whatever their dimensions may be, can be eliminated by using a coherent pulse Doppler radar comprising a cancellation circuit for fixed echoes of all known types. However such a radar does not eliminate echoes corresponding to sea clutter and to forests the trees of which are agitated by the wind, and also the echoes caused by clouds and atmospheric falls (pseudo-fixed echoes); these undesirable echoes generally having a great amplitude so that they make the detection of moving echoes which are superimposed on them difficult.

The object of the present invention is a coherent pulse Doppler radar comprising means permitting detection and elimination of unwanted echoes while permitting detection of moving echoes having radial velocities different from the eliminated echoes.

Included in such a coherent pulse Doppler radar are circuits comprising a high frequency pulse transmitter, a receiver to receive and amplify the pulses received in answer to the pulses transmitted, a phase discriminator receiving, on the one hand, the signal supplied by the receiver and, on the other hand, the signal supplied by a coherent oscillator, a sampling circuit for the signal supplied by the phase discriminator, a circuit for binary coding of the sample amplitude, a memory with m lines and N columns the selection circuits of which are provided, on the one hand, to record the N binary words obtained during each of the $m$ repetition periods in a line of the said memory and, on the other hand, to read out successively at each repetition period the $m$ binary words of a column, a converter of read out binary words into an analog signal, a bank of filters covering the range of Doppler frequencies that are to be and, a bank of detection and threshold circuits each receiving the output signal of a filter and supplying a signal if the filters signals exceed the threshold. The means of the invention also comprise a multiplicity of shift registers with N stages, the digits of which shift one rank at each repetition period, the digit at one end of each register being supplied by the output signal of any one of the detection and threshold circuits among a group of detection and threshold circuits corresponding to contiguous Doppler frequencies. Also included are a multiplicity of circuits each one receiving signals from the output of a certain number of flip-flops placed at the extremity of one of the shift registers and elaborating dense zone signals. Electronic gates placed at the output of the detection and threshold circuits and controlled by the dense zone signals coming from the circuit associated to the shift register receive the output signals of a group.

The invention is thus used in coherent pulse Doppler radars in which the output signal of the phase discriminator corresponding to several repetition periods is sampled, coded, then recorded in a memory.

The above mentioned and other features and objects of this invention will become apparent by reference to the following description taken in conjunction with tHe accompanying drawings in which.

Before describing the said figures, the principle of detection of moving targets in the presence of fixed targets by using the Doppler effect will be briefly reviewed In an electromagnetic detection system working by pulses, the variations of phase shift between the emitted wave and the received wave, from one repetition period to the following one, (which result from reflection of the waves by moving targets) are used. Accordingly, at each repetition period, the phase of the emitted wave is stored and compared with the phase of the received wave. This phase shift is constant from one repetition period to the next for waves received after reflection from fixed targets, while it varies in a linear way in terms of time in the case of waves received after reflection from a target which moves with a constant radial velocity greater than zero with respect to the antenna. If we apply to a phase discriminator, on the one hand, the reference signal which, at each repetition period, stores the phase of the emitted wave, and, on the other hand, the signal received after reflection on a fixed or moving target, we obtain, for signals received after reflection from fixed targets, pulses with a constant amplitude and, for signals received after reflection on moving targets, pulses the amplitude of which varies as a sinewave at a frequency f, generally called Doppler frequency, the latter related to the radial velocity v and the wavelength λ of the system by the equation $f: 2v/\lambda$.

Figure 1:
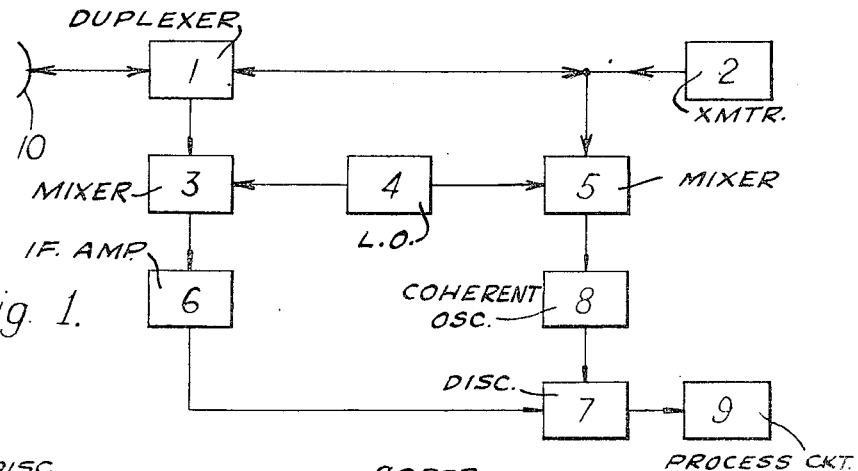
FIG. 1 represents the block diagram of a coherent pulse Doppler radar of the classical type.

FIG. 1 represents a block diagram of a coherent pulse Doppler radar. It comprises an antenna 10 used when transmitting and when receiving, a transmitter 2 supplying high frequency pulses, the said pulses being supplied to the common transmitting and receiving antenna 10 through a high frequency switch 1, better known under the name of "Duplexer". The signals received in answer to the transmitted pulses are switched by the switch 1 towards a mixer 3 receiving the output signal of local oscillator 4. The output signals of the circuit 3 are applied to the intermediate frequency amplifier 6. The output signal of the local oscillator 4 is applied to a second mixer 5 which also receives, during the duration of the transmitted radar pulse, the high frequency signal supplied by the transmitter 2. The intermediate frequency pulse coming out of the mixer 5 is, at the beginning of each repetition period of the radar, used to start the oscillator 8, the said oscillator then supplying an intermediate frequency signal which has a phase relation fixed and predetermined vis-a-vis the phase of the transmitted pulse. At each repetition period, this oscillator is thus started in the way described hereabove, then stopped before the beginning of the following repetition period. Such an oscillator is often called a "coherent oscillator". The output signal of the coherent oscillator 8 is applied to a phase discriminator 7 which also received the output signals of the intermediate frequency amplifier 6. The output signals of the phase discriminator circuit 7 are applied to a processing circuit 9 which can be of any of the known types.

Figure 2:
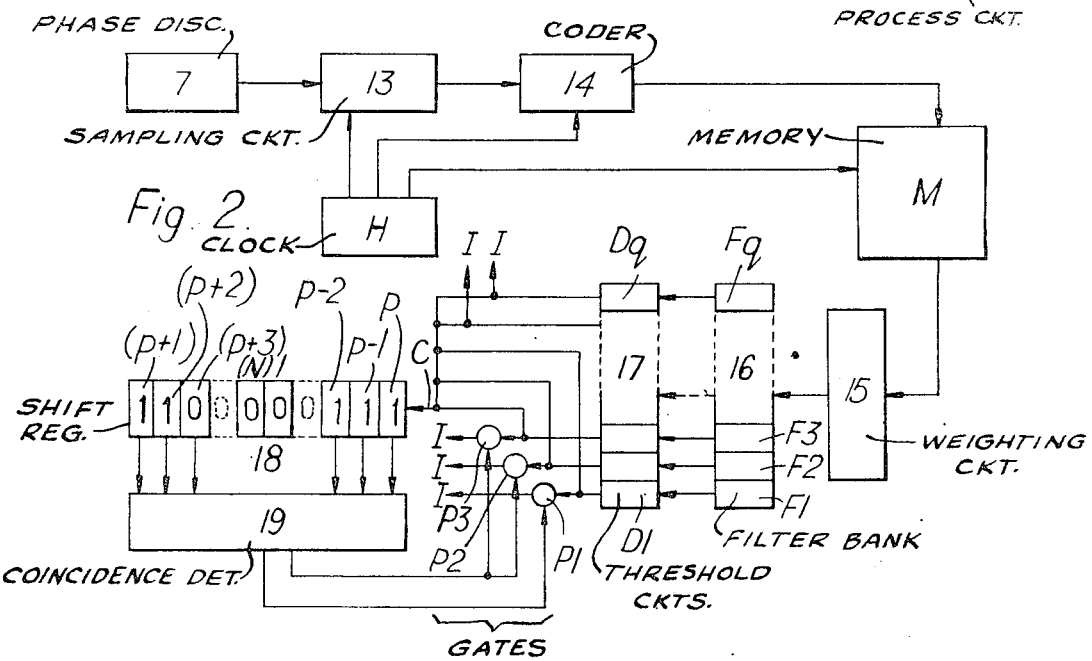
FIG. 2 represents an example of an embodiment of the elimination circuit object of the present invention associated to a coherent pulse Doppler radar comprising a memory in which are recorded the signals received during several repetition periods.

FIG. 2 provides a simplified block schematic of a processing circuit for the phase discriminator output signals, the said processing circuit having been described in a more detailed way in U.S. Pat. No. 3,359,556 and French Pat. No. 1448794. In the circuit of FIG. 2, the signals supplied by the phase discriminator 7 are sampled in a circuit 13 by signals having a frequency 1/r, each sample corresponding to a range increment located at a given distance from the radar. This duration r corresponds to the duration of a transmitted pulse, the latter determining the precision and the range resolution of the radar. This sampling circuit receives from the clock circuit H signals at a frequency 1/r. The successive samples supplied by the circuit 13 are then coded in a coder 14 which supplies, for each sample hereabove defined, a binary number or binary word with n digits, this binary word characterizing the amplitude of the sample. The different signals needed for the functioning of the coder 14 are also supplied by the clock circuit H and their frequency is such that the coding is done in a duration shorter than $r$. *The N binary words corresponding to the signals received during a repetition period of duration T are recorded in a line of the memory M. This memory M is provided* for recording the binary words of *m* successive repetition periods and will thus comprise *n* planes with *m* lines and N columns each. The reading of the memory M is done by column at the rate of one column every repetition period, the binary words of a column giving the "story" of a range increment during *m* successive repetition periods. In order to allow such writing and reading operations, the memory M will comprise for example as many lines as columns. Another structure of such a memory is described in the aforementioned French Pat. 1448794. The binary words of a column are decoded and weighted in a circuit 15 and the analog signal supplied by the circuit 15 is applied to a filter bank 16 covering the range of Doppler frequencies to be detected.

It will be noted that the binary words of a column are recorded in a time mT, if T is the duration of the repetition period of the radar, while they are read out in a time L equal to a maximum T, which constitutes a time compression and therefore is equivalent to a multiplication of the frequencies in the ratio $mT/L = k$. Consequently, if the range of the Doppler frequencies is included, for example, between a lower limit Fi and an upper limit $F/2 = 1/2T$ the corresponding limits of the total bandwidth of the filters of the bank 16 will be $kFi$ and $k T/2$.

Each one of the filters F1 to Fq of the bank 16 is followed by a detection and threshold circuit 0 and the set of the circuits D1 to Dq constitute the bank 17. The presence of a signal on one of the output conductors of the threshold and of detection circuits D1 to Dq of the bank 17 means that there is a moving echo in the range increment corresponding to the read column, the Doppler frequency of the echo being given by the central frequency of the filter which supplied the signal. The position of the echo is given by the rank of the read column. When moving echoes are displayed on the screen of the radar indicator, no distinction of velocity is generally made so that the signal sent to the radar indicator is the sum of the signals coming from the bank 17.

According to the present invention, the circuit comprises a shift register 18, a circuit 19 receiving the state signals from the flip-flops at the ends of the register 18 and electronic gates P dispose on the output conductors of the detection and threshold circuits connected to the filters having the lower central frequencies of the bank 16. As an example, there will be three filters referenced F1, F2 and F3.

The shift register 18 comprises as many stages or flip-flops as increments to be examined, that is to say N. The state of the flip-flop at one end of the register is set by the signal present on the conductor C, to which are connected the output conductors of the circuits D1 to Dq. Accordingly, the presence or absence of a signal on the conductor C, a (moving echo) the end flip-flop will be put into the 1 state or into the 0 state. At each repetition period, for example at the transmitting time, the different digits displayed in the flip-flops will be shifted one rank towards the end of the register.

Figure 3:
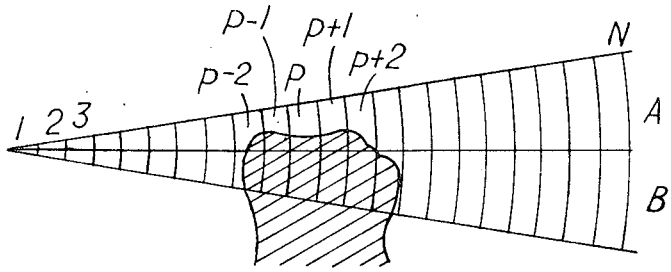
FIG. 3 represents a diagram facilitating the understanding of the functionning of the circuit of FIG. 2.

To explain the functioning of the circuit, it will be supposed, to simplify, that a complete reading of the N columns of the memory M is done while the antenna beam sweeps the angular zone A of the figure 3. It will also be supposed that there is, for example, a pseudofixed echo lying between the range increments *p*—2 to *p*+2, said echo appearing in the angular zone A. During the reading cycle corresponding to the angular zone A, there will be no echo in the range increments 1 to *p*—3 and *p*+3 to N, but the range increments *p*—2 to *p*+2 will contain echoes. During the following reading cycle, to which corresponds the angular zone B, the range increments 1 to *p*—3 and *p*+4 to N will contain no echoes but the range increments *p*—2 to *p*+3 will contain some. After the reading of the pth column during the second reading cycle, the aspect of the shift register 18 is the one represented on the FIG. 2. On FIG. 2, the ranks of the range increments which have supplied the digits displayed in the corresponding flip-flops are written. The digits between brackets correspond to the preceding reading cycle, the others corresponding to the current cycle.

It is thus seen that the penetration of the beam in the zone of the pseudofixed echo causes the appearance of digits 1 in the farthest flip-flops of the register. To detect this echo, it is sufficient to detect a given number of digits 1 at the extremities of the register, it being possible for said digits 1 to be separated by digits 0 and be unequally distributed at the two extremities. This detection is carried out by the coincidence detector 19 to which are applied the state signals of a number (5) of flip-flops of the extremities at the register. Circuit 19 will comprise, for example, a circuit for analog addition of the signals supplied by the register and at least one comparator circuit for comparing the sum signal to a threshold. The value of this threshold will depend on the minimal radial dimension of the zone from which the decision as to the presence of a large clutter echo (due for example to a pseudofixed echo), will be made.

If it is assumed that, because of the fluctuations of the level of the signal received from the pseudofixed echo, there are staticised in the register 18 as many digits 1 as digits 0, and if the minimal radial dimension of the echo that is to be detected is equal to six range increments, the state signals of the six flip-flops at each extremity will be taken into account. That is, in the whole $s = 12$ flip-flops, and the threshold, measured in number of digits 1, will be equal to three.

As in FIG. 2, a circuit 19 can be provided comprising 2 comparators having different thresholds, however, in the example of FIG. 2, if the number of digits 1 is equal to or greater than three, the circuit 19 will supply a signal which will close the electronic gate P1 disposed at the lowest central frequency filter. All echoes corresponding to this frequency will then be eliminated, particularly the pseudofixed echo since its Doppler frequency is generally very low. If the number of digits 1 is equal to or greater than 6, 6 being for example the value of the second threshold, the circuit 19 will supply two signals which will close the electronic gates P1, P2 and P3. It is clear that the values of the thresholds have been given as an example and that, when using the radar, they can be arranged to be modified by the radar operator.

The signals which are supplied to the radar indicator are those appearing on the output conductors of the circuits D4 to Dq together with those supplied by the electronic gates P1, P2 and P3. The conductors which are connected to the radar indicator bear the reference I.

The foregoing description of circuit functions has been accomplished assuming that a pseudofixed echo was present and it waS shown that such an echo was eliminated provided its Doppler frequency corresponded to the frequency band covered by the filters F1, F2 and F3 (generally the case). It would be the same with slow echoes (clouds and/or atmospheric falls) the Doppler frequency of which would be in the bandwidth of the filters which are disconnected. It will be soon that the other moving echoes located in the said zone and having radial velocities corresponding to Doppler frequencies located in the bandwidth of the disconnected filters are also eliminated. However, moving echoes which cause signals having Doppler frequencies higher than the upper limit of the disconnected filters will be passed and therefore detected.

Figure 4:
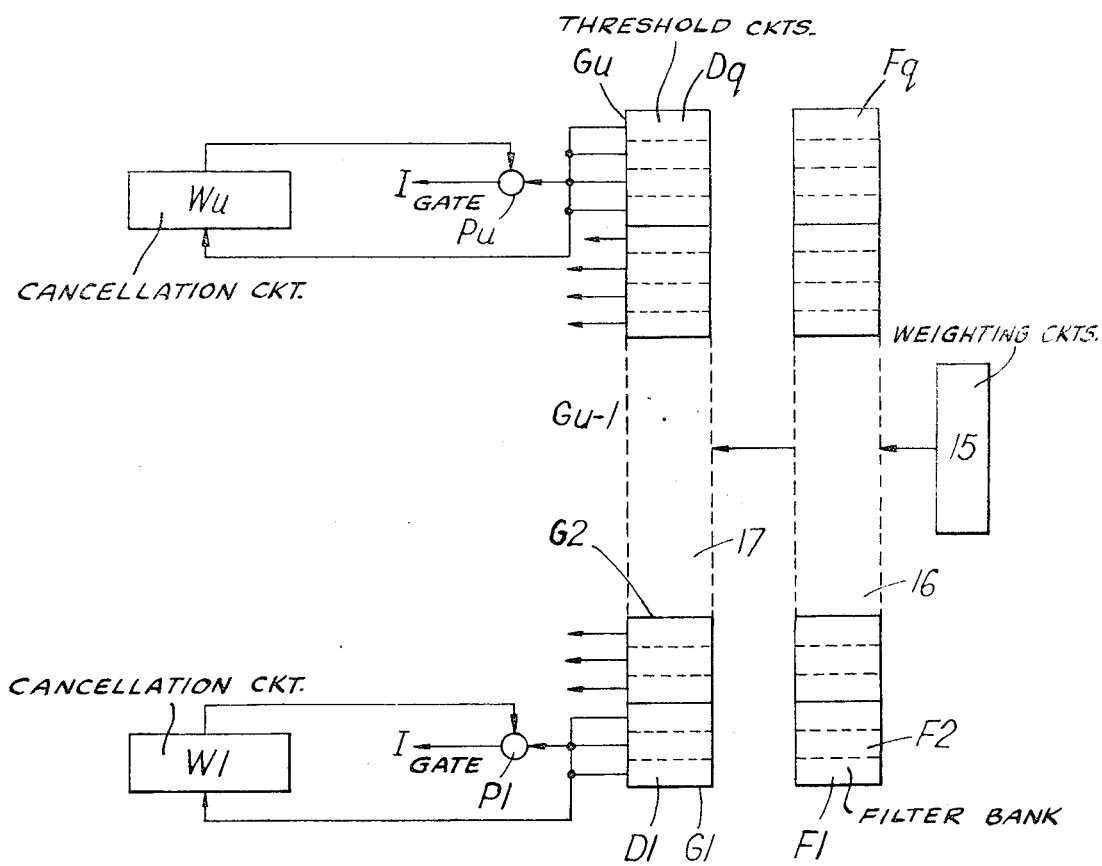
FIG. 4 represents another embodiment of the elimination circuit of the present invention.

When clouds and/or atmospheric falls have high radial velocities, they cannot be eliminated by the circuit of the FIG. 2; however they can be eliminated by using the circuit of the FIG. 4. In FIG. 4, circuits 15, 16 and 17 are those of the FIG. 2. According to the present invention, groups G1 to Gu of detection and threshold circuits are formed, and associated with each group is a circuit W for detection and cancellation of dense zones. Also included are the elements 18 and 19 of FIG. 2 together with an electronic gate P corresponding to the output of group G. On FIG. 4, circuits associated with the groups G1 and Gu are shown.

The functioning of the circuit of FIG. 4 is identical to that of FIG. 2 and it is understood that undesirable echoes of large size whatever their radial velocity can be successively eliminated, while detection of other moving echoes having different radial velocities is undisturbed.

In order that the loss of information introduced by the present system may be minimum, it is understood that as many groups G should ideally be constituted as detection and threshold circuits D, however the cost of such a solution is high. The number of detection and threshold circuits by group therefore depends on the information loss which is allowable. The probability of having an undesirable echo of large size in terms of the radial velocity can also be considered. Thus it is easily understood that it is more likely to encounter slow clouds than rapidly moving ones, so that it is appropriate to provide small groups for the low Doppler frequencies and larger groups for the high Doppler frequencies. Such an approach thus allows equalization of the probability of information loss in all ranges of the Doppler frequencies. It is also possible to take into account the mean spectral width of the spectral line due to clouds and atmospheric falls and provide for a number of circuits by groups covering the said spectral width.

In the description of FIGS. 2 and 4 it has been supposed that the range of Doppler frequencies considered was included between frequencies Fi and F/2. However, it is possible to provide for one or more additional filters to cover the range 0 to Fi. A circuit for detection and elimination of the aforementioned dense zones can be then associated with this additional filter or with this group of additional filters so that only fixed echoes of large dimensions which are undesirable are eliminated while other fixed or very slow moving echoes, particularly the moving echoes having radial velocities momentarily zero may appear.

While the principles of the above invention have been describes in connection with specific embodiments and particular modifications thereof it is to be clearly understood that this description is made by way of example and not as a limitation of the scope of the invention.

I claim:

1. A digital pulse Doppler radar system particularly adapted for discriminating against echo signals of low velocity and large reflectivity, said system having transmitting and coherent detection means including a video phase discriminator, comprising:

sampling means for generating a plurality of digital words each descriptive of the video amplitude in each of a corresponding plurality of range increments during each repetition interval of said radar system;

a digital storage means;

means for storing said digital words in said storage means over a plurality of said repetition intervals;

means for successively sampling and combining said stored digital words by discrete range increments, thereby to provide a digital output signal representative of the video signal amplitudes within successive range increments over said plurality of repetition intervals;

decoding means responsive to said digital output signal to produce an analog video train;

a filter bank responsive to said analog video train, said filter bank having a plurality of channels each adapted to pass a predetermined spectral band of the expected range of Doppler frequencies;

filter detection means responsive to the outputs of said filter bank to produce discrete detected signals corresponding to signals present in a corresponding channel of said filter bank;

a plurality of bistable stages each connected to said filter detection means to change state and thereby record the presence of signal in a corresponding filter channel;

adder means for summing the outputs of said bistable stages and for generating a gating control signal whenever the number of said bistable stages so recording exceeds a predetermined threshold;

and gating means connected in series with at least one of the channel outputs of said filter detection means to interrupt the output therefrom during said gating control signal.

2. The invention set forth in claim 1 in which said adder means includes a plurality of outputs each for providing a separate gating control signal in response to corresponding separate thresholds within said adder means, and said gating means includes a plurality of gates individually in series with predetermined outputs of said filter detection means, said gates being responsive in a predetermined connection pattern to said separate gating control signals, thereby to disable selected ranges of the frequency spectrum of said Doppler frequencies.

3. Apparatus according to claim 2 in which said bistable stages constitute a shift register having a number of such stages equal to the number of range increments within each of said repetition intervals and said adder means produces said plurality of separate gating control signals as a function of the number of said bistable stages changing state within a predetermined plurality of repetition intervals of said radar system.

4. Apparatus according to claim 2 in which said gates are disposed in series with filter detection means outputs corresponding to predetermined lower frequency Doppler channels, thereby to disable Doppler video signals corresponding to lower target velocities from large reflecting media.

* * * * *